US006882866B2

(12) United States Patent
Sato

(10) Patent No.: US 6,882,866 B2
(45) Date of Patent: Apr. 19, 2005

(54) PORTABLE INFORMATION APPARATUS AND INFORMATION NOTIFICATION METHOD FOR THE SAME

(75) Inventor: Yoneo Sato, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 320 days.

(21) Appl. No.: 10/055,929

(22) Filed: Jan. 28, 2002

(65) Prior Publication Data

US 2002/0132639 A1 Sep. 19, 2002

(30) Foreign Application Priority Data

Mar. 15, 2001 (JP) .................................... 2001-074715

(51) Int. Cl.[7] .............................................. H04Q 7/20
(52) U.S. Cl. ................. 455/556.2; 455/401; 455/572; 455/573
(58) Field of Search ................................ 455/572, 573, 455/401, 575.1, 556.1, 556.2, 567, 574, 550.1

(56) References Cited

U.S. PATENT DOCUMENTS 5,794,152 A * 8/1998 Hikuma et al. ............. 455/502
5,915,227 A * 6/1999 Hikuma et al. ............. 455/566
6,226,536 B1 * 5/2001 Miyashita ................... 455/567
6,324,412 B1 * 11/2001 Alen et al. .................. 455/567
6,373,229 B1 * 4/2002 Slusky ..................... 340/636.2

FOREIGN PATENT DOCUMENTS

| JP | 3-204260 | 9/1991 |
|---|---|---|
| JP | 5-167658 | 7/1993 |
| JP | 8-116351 | 5/1996 |
| JP | 10-136116 | 5/1998 |
| JP | 11-225191 | 8/1999 |
| JP | 11-234391 | 8/1999 |
| JP | 11-266319 | 9/1999 |
| JP | 2000-66758 | 3/2000 |
| JP | 2000-165513 | 6/2000 |
| JP | 2000-307757 | 11/2000 |

* cited by examiner

*Primary Examiner*—Sonny Trinh
(74) *Attorney, Agent, or Firm*—Pillsbury Winthrop LLP

(57) ABSTRACT

A portable information apparatus is disclosed which includes detecting section detecting an attached/detached state of the portable information apparatus to a housing portion, deciding section deciding a method of notifying a user of due items, based on an attached/detached state detected by the detecting section, and notifying section notifying the user of the due items according to a notification method decided by the deciding section.

8 Claims, 5 Drawing Sheets

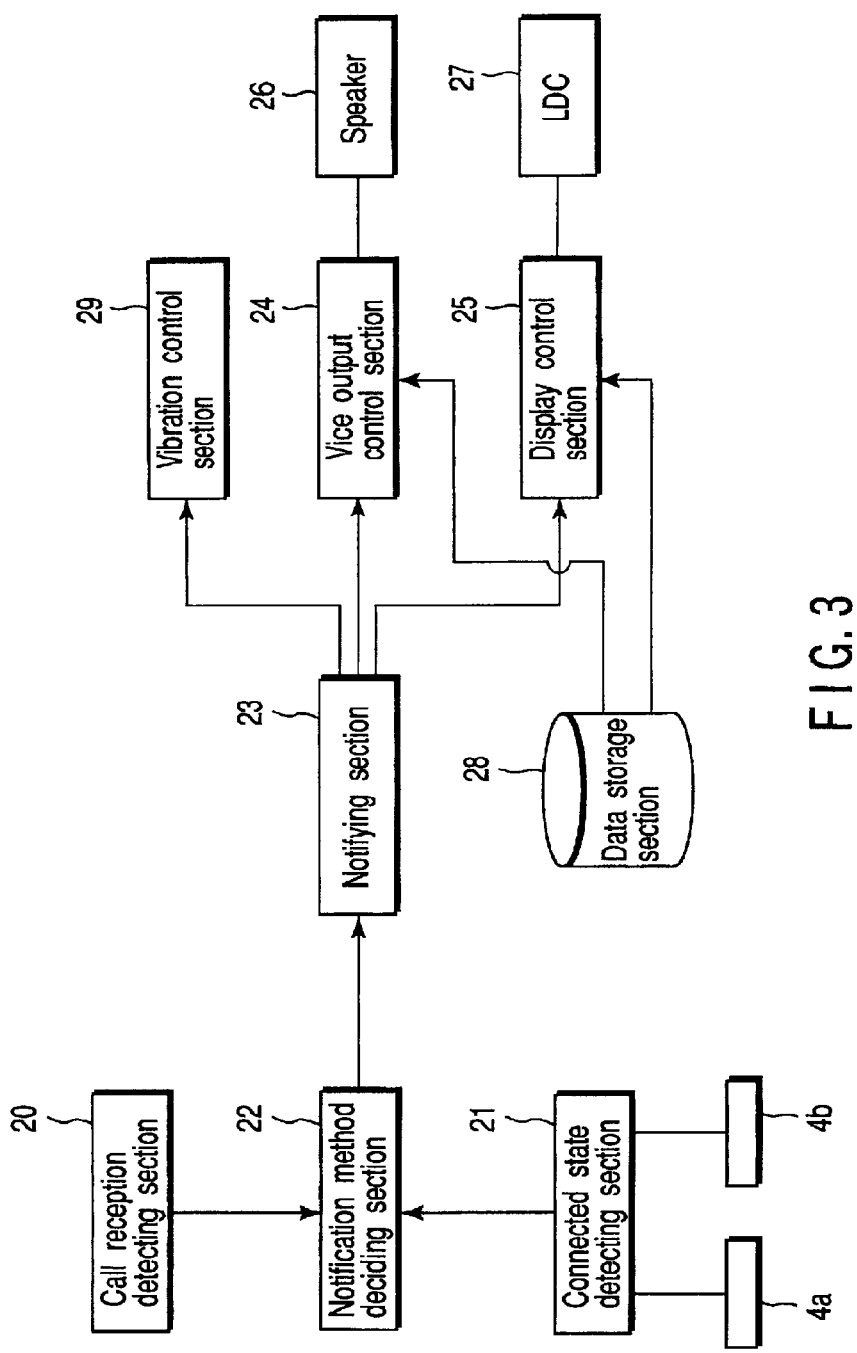
F I G. 3

PORTABLE INFORMATION APPARATUS AND INFORMATION NOTIFICATION METHOD FOR THE SAME

CROSS-REFERENCE TO RELATED APPLICATIONS

This application is based upon and claims the benefit of priority from the prior Japanese Patent Application No. 2001-074715, filed Mar. 15, 2001, the entire contents of which are incorporated herein by reference.

BACKGROUND OF THE INVENTION

1. Field of the Invention

The present invention relates to a portable information apparatus such as a PDA or a mobile phone and an information notification method for the same.

2. Description of the Related Art

In the recent years, a mobile phone has remarkably been prevailing changes, its method of controlling call-reception according to whether it is attached to a charger or not. Specifically, for example, if the mobile phone is attached to a charger, it notifies call reception with a sound and a message and, otherwise, it vibrates itself for notification.

Jpn. Pat. Appln. KOKAI Publication No. 5-16758, on the other hand, discloses a control for controlling the lighting of an indicator lamp used in a mobile apparatus.

This lighting control has such a feature that when a relevant mobile apparatus is not in a cradle, its indicator lamp may light up only when it is dark around it to thereby suppress the exhaustion of a built-in rechargeable battery as much as possible.

However, in call-reception control of such a mobile phone, which changes control method according to whether it is attached to or detached from a charger, it cannot change the call-reception notification method if it is attached to the charger. Therefore, for example, even if it is attached to a charger, the mobile phone cannot accommodate such a case where the user wishes not to be notified of call reception with a voice, for example, at night, which has been a problem.

Similarly, an indicator-lamp lighting control used in a mobile apparatus disclosed in Jpn. Pat. Appln. KOKAI Publication No. 5-167658 cannot change the call-reception notification method if it is attached to a cradle.

BRIEF SUMMARY OF THE INVENTION

In view of the above, it is an object of the present invention to provide a portable information apparatus and information notification method for the same that can change a method for notifying the user of due information such as set-time alarm, call reception, and mail reception, according to how it is attached to its housing portion.

To this end, therefore, a first aspect of the present invention provides a portable information apparatus including a plurality of terminals for connecting to a terminal of a housing portion, detecting section detecting an interconnection state between the plurality of terminals and the terminal of the housing portion, deciding section deciding a method of notifying the user of due items based on a connection state detected by the detecting section, and notification section notifying the user of the due items.

This first aspect of the present invention further features the following:

(1) The portable information apparatus specifically has two terminals, whereby when neither of these two terminals is connected to a terminal of the housing portion, the deciding section decides to use at least one of a method of raising a voice to notify the user of due items and a method of displaying a message on an indicator of the portable information apparatus and, when the other terminal of connected to the terminal of the housing portion, the deciding section avoids notifying the user of the due items;

(2) In the case of (1) above, if none of the two terminals is connected to the housing portion, the deciding section decides to use at least one of the method of raising a sound to notify the user of the due items, the method of displaying a message on the indicator of the portable information apparatus, and a method of vibrating the portable information apparatus; and (3) The due items to be notified to the user include at least one of set-time alarm prepared in a schedule managing program, call reception, and mail reception.

A second aspect of the present invention provides a portable information apparatus including detecting section detecting a state of whether the apparatus is attached to or detached from a housing portion, deciding section deciding a method for notifying the user of due items based on an attached/detached state detected by the detecting section, and a notification method for notifying the user of the due items according to a notification method decided by the detecting section.

A third aspect of the present invention provides a method, for a portable information apparatus, for detecting a connection state between a terminal of a housing portion for connecting to the portable information apparatus and a plurality of terminals of the portable information apparatus to decide a method for notifying the user of due items based on thus detected connection state, thus notifying the user of the due items according to thus decided notification method.

A fourth aspect of the present invention provides a method, in a portable information apparatus, of detecting a state of whether the portable information apparatus is attached to or detached from a housing portion to decide a method of notifying the user of due items based on this detected attached/detached state, thus notifying the user of the due items according to thus decided notification method.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the present invention, and together with the general description given above and the detailed description of the embodiments given below, serve to explain the principles of the present invention.

FIG. 3 is a functional block diagram for showing a portable information apparatus related to the embodiment of the present invention;

DETAILED DESCRIPTION OF THE INVENTION

The following will describe a PDA (personal digital assistants) related to embodiments of the present invention with reference to the drawings.

Figure 1:
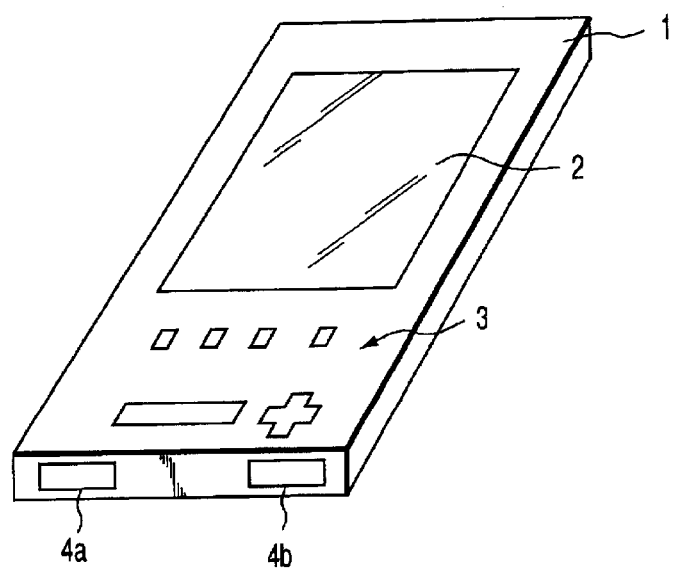
FIG. 1 is a perspective view for showing a PDA related to one embodiment of the present invention.

FIG. 1 is a perspective view of a PDA related to one embodiment of the present invention.

As shown in it, on a surface of a PDA 1 of this embodiment are provided an LCD (Liquid Crystal Display) 2 and a key entry section 3. Furthermore, terminals 4a and 4b are provided at the right and left positions of the bottom surface of the PDA 1 for connection with the cradle terminal.

Figure 2:
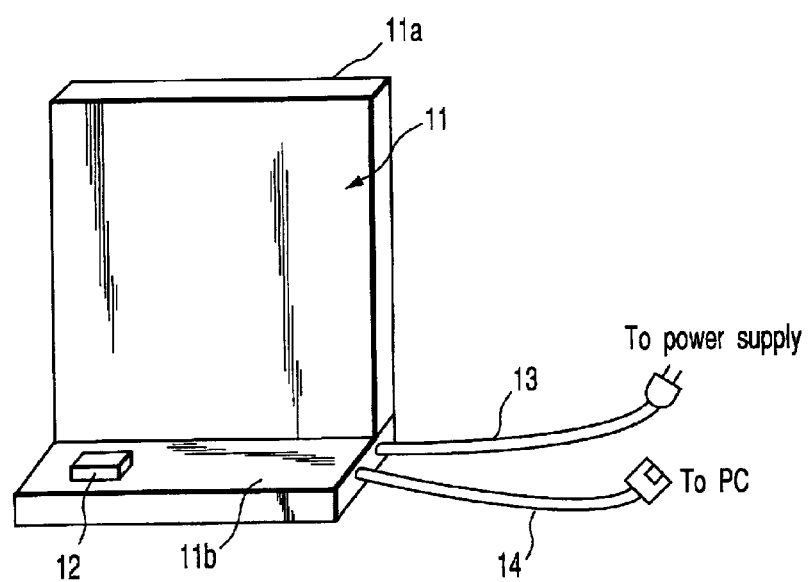
FIG. 2 is a diagram for showing a cradle.

FIG. 2 is a diagram for showing a cradle.

As shown in it, a cradle 11 has a vertical plate 11a for supporting the A DIAGRAM and a bottom plate 11b extending in a direction perpendicular to this vertical plate 11a. A terminal 12 for connection with terminals 4a and 4b of the PDA 1 is provided on the upper surface of the bottom plate 11b.

Figure 8:
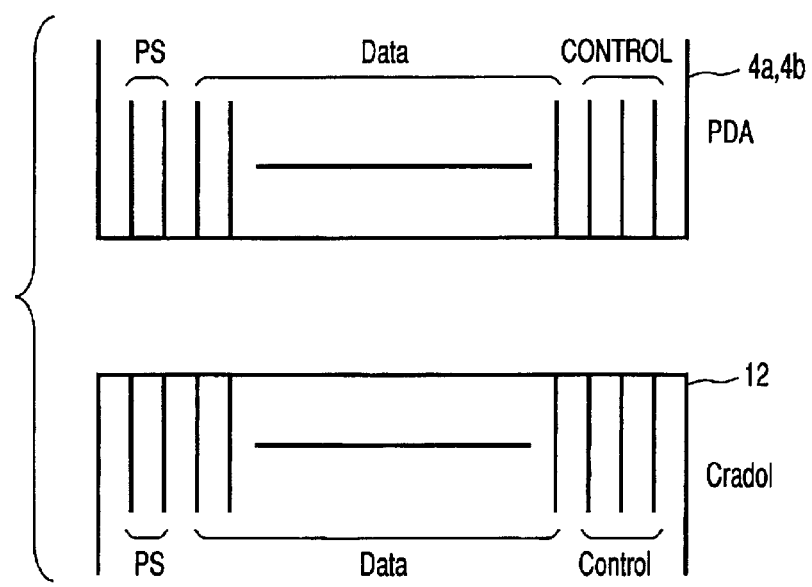
FIG. 8 is a diagram for showing another construction of wiring between the cradle terminal and the PDA terminals.

As shown in FIG. 8, this terminal 12 and the PDA 1's terminals 4a and 4b share, when interconnected, a power supply line, a data line, and a control line in such a configuration that power is supplied through the fu power line 13 extending from a side of the bottom plate 11b shown in FIG. 2 and data and control signals are supplied from a personal computer connected through a data bus 14 e.g. a serial bus and a USB bus etc.

FIG. 3 is a functional block diagram for showing a portable information apparatus related to the embodiment of the present invention.

As shown in it, the portable information apparatus of this embodiment has a call-reception detecting section 20, connection state detecting section 21, a notification method deciding section 22, a notifying section 23, a voice-output control section 24, a display control section 25, a speaker 26, an LCD 27, a data storage section 28, and a vibration control section 29.

The call-reception detecting section 20 detects reception of a phone call destined to itself.

Figure 4:
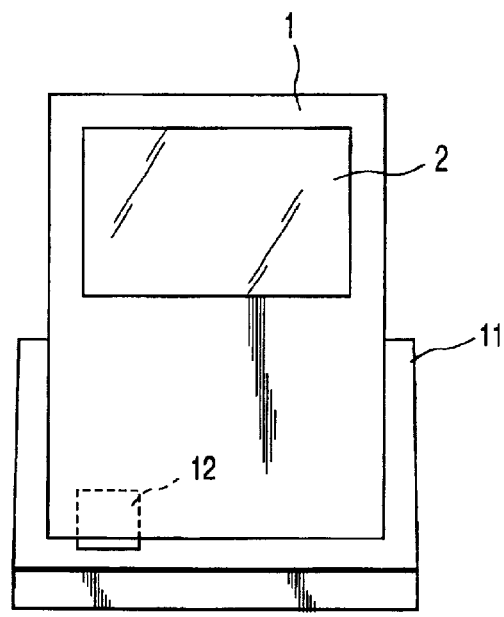
FIG. 4 is a diagram for showing a state where PDA is attached to a cradle.
Figure 5:
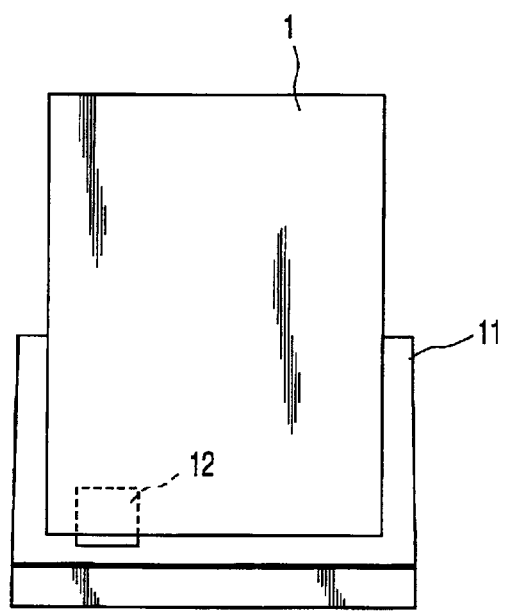
FIG. 5 is another illustration for showing a state where the PDA is attached to the cradle.

The connection state detecting section 21 detects to which one of the terminals 4a and 4b the terminal 12 of the cradle 11 is connected. That is, when the terminal 12 of the cradle 11 is connected to the terminal 4a, it detects that as shown in FIG. 4 the PDA 1 is loaded in such a manner that the LCD 1 faces forward and, when the terminal 12 of the cradle 11 is connected to the terminal 4b, it detects that as shown in FIG. 5 the LCD 1 faces backward.

The notification method deciding section 22, upon detection of a phone call by the call-reception detecting section 20, decides a method for notifying the user of call reception based on a connection state detected by the connection state detecting section 21.

The notifying section 23 notifies the voice output control section 24 and the display control section 25 of a notification method decided by the notification method deciding section 22.

The voice output control section 24 reproduces voice data stored in the data storage section 28 according to a notification method notified by the notifying section 23.

The display control section 25 displays on the LCD 1 display data stored in the data storage section 28 according to a notification method notified by the notifying section 23.

The data storage section 28 stores voice data used by the voice output control section 24 and display data used by the display control section 25.

The vibration control section 29 controls vibrations of the PDA itself according to a notification method notified by the notifying section 23.

Figure 6:
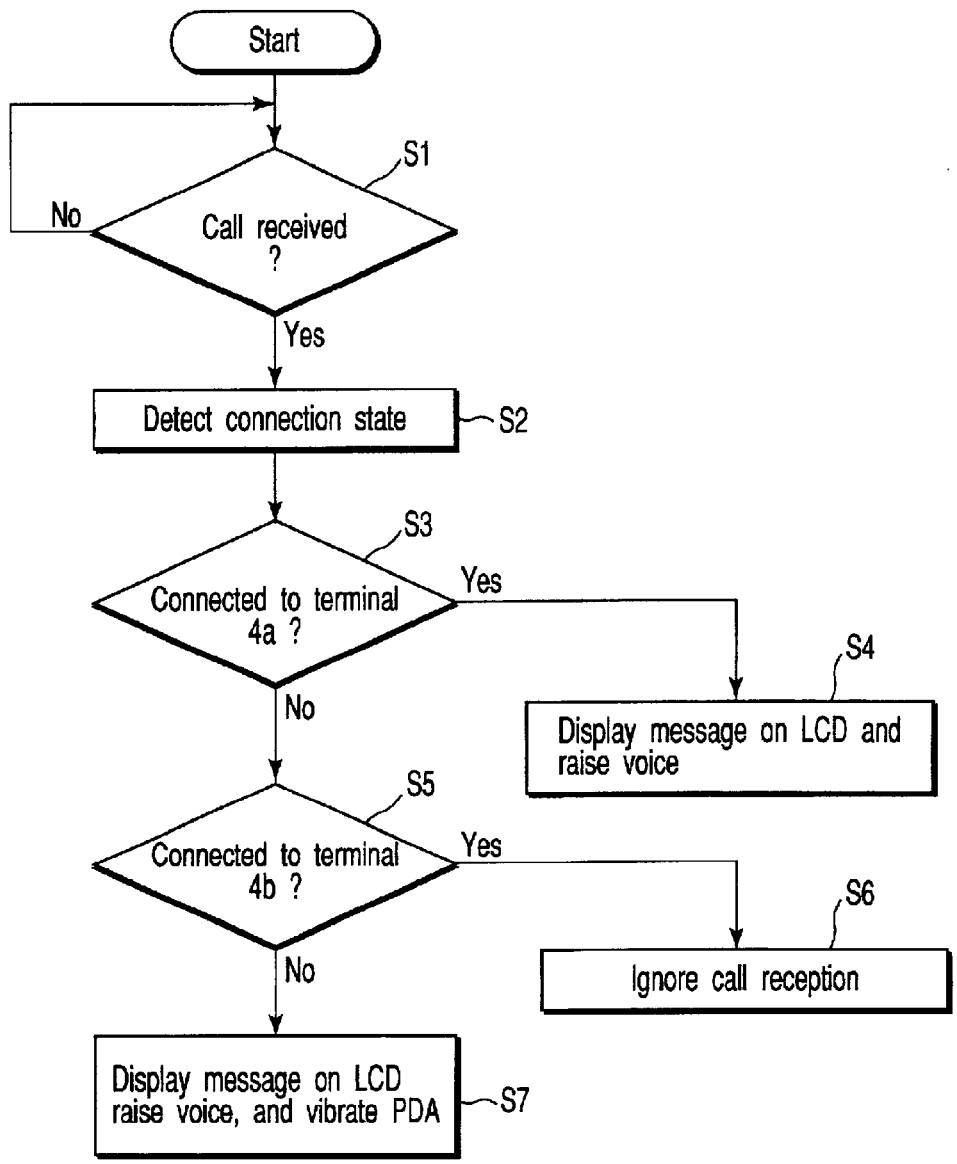
FIG. 6 is a flowchart for showing operations of the PDA related to the embodiment of the present invention.

The following will describe operations of the PDA related to the embodiment with reference to a flowchart of FIG. 6.

First, the call-reception detecting section 20 decides whether a phone call is received (step S1) and, if it decides reception, the connection state detecting section 21 detects a connection state (step S2).

Then, the connection state thus detected by the connection state detecting section 21 indicates that the cradle terminal is connected to the terminal 4a, a message is displayed on the LCD and a voice is raised from the speaker (step S4).

Specifically, the notification method deciding section 22 decides a notification method to such an effect that a message may be displayed on the LCD and a voice may be raised, which notification method thus decided is then notified to the voice output control section 24 and the display control section 25. The voice output control section 24 in turn reproduces voice data stored in the data storage section 28, raising its voice from the speaker 26. The display control section 25 displays a message on the LCD 27 based on display data stored in the data storage section 28.

If, at step 33, it is decided that the cradle terminal is not connected to the terminal 4a, the detecting section 21 then decides whether the cradle terminal is connected to the terminal 4b (step S5).

If it is decided that the cradle terminal is connected to the terminal 4b at step S5, call reception is ignored (step S6). That is, in this case, the PDA is attached to the cradle with its LCD facing backward. The user may attach his PDA to a cradle in such a state before, for example, he goes to bed, thus preventing disturbance when he is asleep.

If, at step S5, it is decided that the cradle terminal is not connected to the terminal 4b, that is, if the PDA is not attached to the cradle, on the other hand, a message is displayed on the LCD and a voice is raised from the speaker and also the PDA is vibrated to that effect.

Specifically, the notification method deciding section 22 decides a notification method to such an effect that a message may be displayed on the LCD and a voice may be raised, which notification method thus decided is then notified to the voice output control section 24 and the display control section 25. The voice output control section 24 in turn reproduces voice data stored in the data storage section 28, thus raising the corresponding voice from the speaker 26. Furthermore, the display control section 25 displays the message on the LCD 27 based on display data stored in the data storage section 28. Further, the vibration control section 29 vibrates the PDA according to a notification method notified from the notifying section 23.

According to the portable information apparatus of the embodiment, therefore, a method of notifying the user of his due items to be notified to the user (e.g., phone-call reception, mail reception, alarm of set time prepared in schedule program) can be changed on the basis of the state of connection to the cradle, thus properly making notification in use of the apparatus by the user.

Although the above embodiment has been described with a notification method in a case where a phone call is received, the present invention is not limited thereto. That is, in place of the call, any item may be acceptable as far as it is to be notified to the user, including a reception-subject mail or a set time alarm prepared in a schedule managing program.

Furthermore, although the above embodiment has been described with a case of changing the method of providing a PDA with a plurality of terminals so that based on a state of connection of the cradle terminal to these terminal the method for notifying to the user may be changed, the method of deciding the connection state is not limited thereto.

Figure 7:
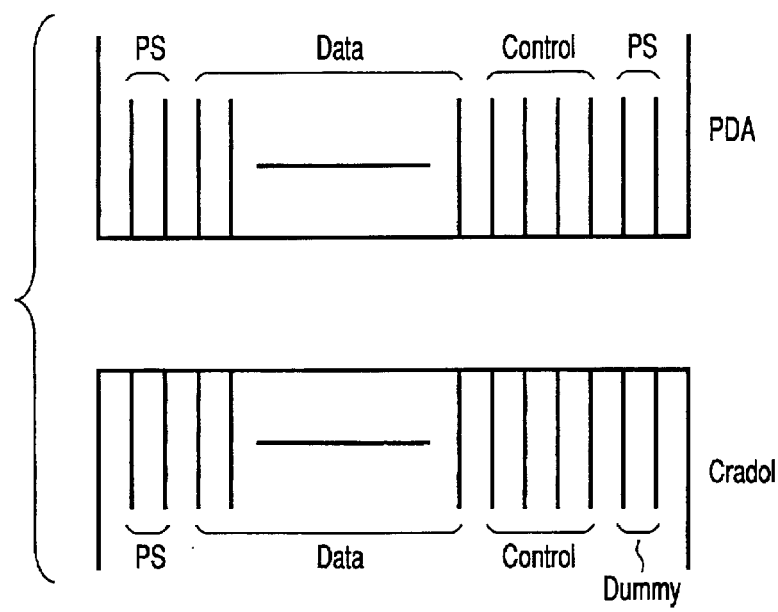
FIG. 7 is a diagram for showing a construction of wiring between a cradle terminal and PDA terminals.

For example, one terminal is provided to the PDA, another one terminal is provided to the cradle and each of which has a wiring construction as shown in FIG. 7. Specifically, as shown in FIG. 7, the PDA side terminal is provided with a power supply line on both ends thereof and the cradle side terminal, with a power supply line and a dummy line. By employing such a wiring construction, it is possible to decide the attached/detached state of the cradle by observing a bias of the power supply line.

It should be noted there in such a construction as shown in FIG. 7, the data line and the control line on the side of the PDA can be switched internally according to the attached/detached state. That is, supposing that the state shown in FIG. 7 indicates a state where the FDA is attached with the LCD facing forward, when it is attached with the LCD facing backward, the control line corresponds as a wiring line to the control line of the cradle, so that the wiring line is switched within the PDA in such a manner that the data line corresponds as a wiring line to that of the cradle. By employing such a configuration, even if the PDA has only one terminal, it is possible to recognize the attached/detached state and also to provide a match between the PDA's data and control lines and the cradle's data and control lines.

Further, although the embodiment has been described with a case where the PDA is erected vertically, in a state where the PDA is housed in the cradle, lying horizontally, it can decide its attached/detached state as well. In this case, for example, a detecting switch can be provided on the rear face of the cradle so as to decide that the LCD is attached in the cradle as facing forward if the detection switch is ON and that it is attached backward if it is OFF.

That is, the embodiments of the present invention may be subject to a variety of methods for detecting the state where the PDA is attached to or detached form the cradle.

While there has been described what is at present considered to be preferred embodiments of the present invention, it will be understood that various modifications may be made therein. In addition, the embodiments may be appropriately combined as much as possible to give combined effects correspondingly. Further, the above embodiments contain a variety steps of inventions and may be combined in terms of various components thereof to extract a variety of other inventions. For example, if any invention is extracted by omitting some of all of those components given in the embodiments, in implementation of that extracted invention, the omitted components are to be suitably compensated for by the known and practical technologies.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A portable information apparatus comprising:
    a connected state detecting section detecting a connected state of the portable information apparatus to a cradle;
    a notification method deciding section deciding a method for notifying a user of due items, based on the connected state detected by the connected state detecting section;
    a notifying section notifying the notification method decided by the notification method deciding section; and
    first and second terminals for connecting a terminal of the cradle;
    wherein the connected state detecting section detects which of the first and second terminals is connected to the terminal of the cradle, and
    wherein the notification method deciding section decides that the notification is performed by a first notification method when the connected state detecting section detects that the first terminal is connected to the terminal of the cradle and decides that the notification is not performed when the connected state detecting section detects that the second terminal is connected to the terminal of cradle.

2. The portable information apparatus according to claim 1, wherein the notification method deciding section decides that the notification is performed by a second notification method when the connected state detecting section detects that both of the first and second terminals are not connected to the terminal of the cradle.

3. The portable information apparatus according to claim 2, further comprising a speaker and a vibration control section for vibrating the portable information apparatus, wherein the first notification method is a voice output from the speaker and the second notification method is a vibration by the vibration control section.

4. The portable information apparatus according to claim 2, further comprising a display and a vibration control section for vibrating the portable information apparatus, wherein the first notification method is a display of a message by the display and the second notification method is a vibration by the vibration control section.

5. An information notifying method for a portable information apparatus, comprising:
    detecting a connected state of the portable information apparatus to a cradle;
    deciding a method for notifying a user of due items, based on the connected state detected; and
    notifying the notification method decided;
    wherein the portable information apparatus has first and second terminals for connecting a terminal of the cradle,
    wherein the step of detecting detects which of the first and second terminals is connected to the terminal of the cradle, and
    wherein the step of deciding decides that the notification is performed by a first notification method when the step of detecting detects that the first terminal is connected to the terminal of the cradle and decides that the notification is not performed when the step of detecting detects that the second terminal is connected to the terminal of cradle.

6. The method according to claim 5, wherein the step of deciding decides that the notification is performed by a second notification method when the connected state detecting section detects that both of the first and second terminals are not connected to the terminal of the cradle.

7. The method according to claim 6, further comprising a speaker and a vibration control section for vibrating the portable information apparatus, wherein the first notification method is a voice output from the speaker and the second notification method is a vibration by the vibration control section.

8. The method according to claim 6, further comprising a display and a vibration control section for vibrating the portable information apparatus, wherein the first notification method is a display of a message by the display and the second notification method is a vibration by the vibration control section.

* * * * *